US007728931B2

(12) United States Patent
Hoffmuller

(10) Patent No.: US 7,728,931 B2
(45) Date of Patent: Jun. 1, 2010

(54) SECURITY ELEMENT AND METHOD FOR PRODUCING SAME

(75) Inventor: Winfried Hoffmuller, Bad Tolz (DE)

(73) Assignee: Giesecke & Devrient GmbH, Munich (DE)

(*) Notice: Subject to any disclaimer, the term of this patent is extended or adjusted under 35 U.S.C. 154(b) by 0 days.

(21) Appl. No.: 11/568,302

(22) PCT Filed: Apr. 29, 2005

(86) PCT No.: PCT/EP2005/004683

§ 371 (c)(1), (2), (4) Date: Oct. 25, 2006

(87) PCT Pub. No.: WO2005/105474

PCT Pub. Date: Nov. 10, 2005

(65) Prior Publication Data

US 2007/0216518 A1 Sep. 20, 2007

(30) Foreign Application Priority Data

Apr. 30, 2004 (DE) ....................... 10 2004 021 246

(51) Int. Cl.
*G02F 1/1335* (2006.01)
*G02F 1/13* (2006.01)

(52) U.S. Cl. ....................................... 349/117; 349/187

(58) Field of Classification Search ................. 349/117, 349/187
See application file for complete search history.

(56) References Cited

U.S. PATENT DOCUMENTS 4,637,896 A 1/1987 Shannon
5,678,863 A * 10/1997 Knight et al. ............... 283/113
6,417,902 B1 7/2002 Greenfield et al.
6,421,107 B1 7/2002 Greenfield et al.
6,570,648 B1 * 5/2003 Muller-Rees et al. ......... 356/71

(Continued)

FOREIGN PATENT DOCUMENTS

CA 2032587 7/1996

(Continued)

OTHER PUBLICATIONS

International Search Report, International Application No. PCT/EP2005/004673, 4 pages, Aug. 4, 2005.

(Continued)

*Primary Examiner*—Uyen-Chau N Le
*Assistant Examiner*—Rhonda S Peace
(74) *Attorney, Agent, or Firm*—Greenlee, Winner and Sullivan, P.C.

(57) ABSTRACT

The present invention relates to a security element (30) for securing valuable articles, having a first optically active layer (32) that is present at least in some areas and comprises a cholesteric liquid crystal material. According to the present invention, a second optically active layer (34) that is present at least in some areas is provided, the first and the second layer (32, 34) being stacked in an overlap area. Here, the first optically active layer (32) selectively reflects light in a first wavelength range having a first circular polarization direction, and the second optically active layer (34), either itself or, in the overlap area, in coaction with the first optically active layer (32), selectively reflects light in a second wavelength range having a second direction of circular polarization.

30 Claims, 7 Drawing Sheets

U.S. PATENT DOCUMENTS

Figure 1:
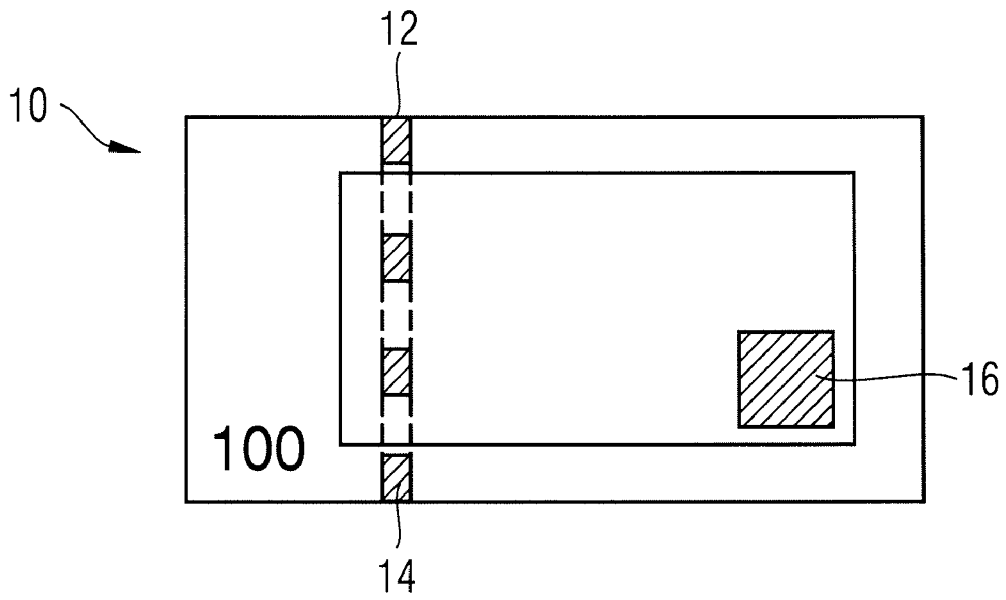

| | | | |
|---|---|---|---|
| 6,582,781 | B1 | 6/2003 | Schuhmacher et al. |
| 7,054,043 | B2 | 5/2006 | Mengel et al. |
| 7,401,817 | B2 * | 7/2008 | Muller-Rees et al. ......... 283/72 |
| 2002/0022093 | A1 | 2/2002 | Kuntz et al. |
| 2002/0117845 | A1 | 8/2002 | Ahlers et al. |
| 2003/0012935 | A1 | 1/2003 | Kuntz et al. |
| 2003/0179363 | A1 * | 9/2003 | Wang et al. ................... 356/71 |
| 2007/0241553 | A1 | 4/2007 | Heim et al. |
| 2007/0165182 | A1 * | 7/2007 | Hoffmuller et al. ......... 349/187 |
| 2007/0211238 | A1 * | 9/2007 | Hoffmuller et al. ........... 356/71 |
| 2007/0216518 | A1 | 9/2007 | Hoffmuller |
| 2007/0229928 | A1 * | 10/2007 | Hoffmuller et al. ........... 359/15 |
| 2007/0246933 | A1 | 10/2007 | Heim |
| 2007/0274559 | A1 | 11/2007 | Depta |
| 2008/0014378 | A1 | 1/2008 | Hoffmuller |
| 2008/0054621 | A1 * | 3/2008 | Burchard et al. .............. 283/72 |
| 2008/0079257 | A1 | 4/2008 | Fessl |
| 2008/0088859 | A1 | 4/2008 | Depta |
| 2008/0160226 | A1 | 7/2008 | Kaule |
| 2008/0163994 | A1 | 7/2008 | Hoppe |
| 2008/0198468 | A1 | 8/2008 | Kaule |
| 2008/0216976 | A1 | 9/2008 | Ruck |
| 2008/0250954 | A1 | 10/2008 | Depta |
| 2008/0258456 | A1 | 10/2008 | Rahm |
| 2008/0540954 | | 10/2008 | Depta |
| 2009/0001709 | A1 | 1/2009 | Kretschmar |
| 2009/0008923 | A1 | 1/2009 | Kaule |
| 2009/0008926 | A1 | 1/2009 | Depta |

FOREIGN PATENT DOCUMENTS

| | | | |
|---|---|---|---|
| DE | 3942663 | A1 | 6/1991 |
| DE | 04041025 | | 6/1992 |
| DE | 19907697 | | 8/2000 |
| DE | 10044465 | | 3/2002 |
| DE | 10243650 | | 4/2004 |
| DE | 10243650 | A1 * | 4/2004 |
| EP | 0435029 | | 12/1990 |
| EP | 0435029 | | 7/1991 |
| EP | 0516790 | | 12/1992 |
| EP | 0407550 | | 10/1994 |
| EP | 1120737 | | 8/2001 |
| EP | 1120737 | A1 * | 8/2001 |
| EP | 1156934 | | 7/2003 |
| EP | 1381022 | | 1/2004 |
| EP | 0911758 | | 11/2005 |
| EP | 1628147 | A1 | 2/2006 |
| GB | 2201376 | A | 9/1988 |
| GB | 2276883 | | 10/1994 |
| GB | 2282145 | | 3/1995 |
| GB | 2282145 | A | 3/1995 |
| GB | 2328180 | A | 2/1999 |
| JP | 2000255200 | A | 9/2000 |
| JP | 2003145912 | A | 5/2003 |
| WO | WO 98/15418 | | 4/1998 |
| WO | WO 98/25236 | | 6/1998 |
| WO | WO 98/52077 | | 11/1998 |
| WO | WO 9852077 | A1 * | 11/1998 |
| WO | WO 99/01291 | | 1/1999 |
| WO | WO 00/50249 | | 8/2000 |
| WO | WO 01/55960 | | 8/2001 |
| WO | WO 02/061470 | | 8/2002 |
| WO | WO 03/006261 | | 1/2003 |
| WO | WO 03/061980 | | 7/2003 |
| WO | WO 03/106188 | | 12/2003 |
| WO | WO 2004/028824 | | 4/2004 |
| WO | WO 2005/101101 | | 10/2005 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006040069 | | 4/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |

OTHER PUBLICATIONS

International Preliminary Report on Patentability, English Translation, International Application No. PCT/EP2006/001169, 5 pages.

International Search Report, International Application No. PCT/EP2005/004683, 6 pages, Dec. 6, 2005.

International Preliminary Report on Patentability, English Translation, International Application No. PCT/EP2005/004683, 14 pages.

U.S. Appl. No. 11/719,843, filed Apr. 3, 2008, Kaule.

U.S. Appl. No. 11/995,227, Gruszczynski.

U.S. Appl. No. 12/294,222, filed Sep. 23, 2008, Hoffmuller.

International Search Report, International Application No. PCT/EP2005/008568, 3 pages, Dec. 13, 2005.

International Preliminary Report on Patentability, International Application No. PCT/EP2005/008568, 7 pages, Feb. 20, 2007.

van Renesse, R. L., "Liquid Crystal Security Devices," Chapter 13, In: Optical Document Security, 2nd edition, Artech House, pp. 263-280, 1994.

EP1744903B1 (PCT/EP2005/004683), European Patent Office Communications of Dec. 11, 2009 and Jan. 14, 2010; and Certain Documents from the European Patent Office Epoline/Register system available on Mar. 8, 2010, 66 pages.

* cited by examiner

SECURITY ELEMENT AND METHOD FOR PRODUCING SAME

CROSS-REFERENCE TO RELATED APPLICATIONS

This application is the U.S. National Phase of International Application No. PCT/EP2005/04683, filed Apr. 29, 2005, which claims the benefit of German Patent Application DE 10 2004 021 246.5, filed Apr. 30, 2004, both of which are hereby incorporated by reference to the extent not inconsistent with the disclosure herewith.

The present invention relates to a security element for securing valuable articles, having a first optically active layer that is present at least in some areas and that comprises cholesteric liquid crystal material. The present invention further relates to a method for manufacturing such a security element, a security arrangement that comprises, in addition to such a security element, a separate display element, and a security paper and a valuable article that are furnished with such a security element or such a security arrangement.

For protection, valuable articles such as branded articles and value documents are often equipped with security elements that permit the authenticity of the valuable article to be verified, and that simultaneously serve as protection against unauthorized reproduction.

Optically variable elements that, at different viewing angles, give the viewer a different image impression, for example a different color impression, are often used as security elements. From publication EP 0 435 029 A2 is known such a security element having a plastic-like layer comprising a liquid crystal polymer, which layer shows a marked play of changing colors at room temperature. It is possible to combine the optically variable effects of the liquid crystal polymers by coloring any layers with conventional inks, allowing patterns to be produced that become visible only when the security elements are tilted. The dyes themselves can be introduced in any layer or applied as a print image.

In the security elements described, due to the physical properties, the color-shift effect of the liquid crystal layers always causes a shift in the reflected light wavelength from the longer-wave range when viewed vertically to the shorter-wave range when the layers are viewed at an acute angle. The options for producing different color-shift effects are thus limited.

From publication EP 1 156 934 B1 is known a security element having a liquid crystal layer as the optically variable material. Described is an exemplary embodiment having an arrangement of register-maintaining printing layers comprising right-handed and left-handed liquid crystal material, which layers display the same appearance under normal illumination, such that a piece of information depicted by the shape or the outline of the areas cannot be perceived. Only when the layers are viewed through a suitable polarization filter can the piece of information be perceived, due to the difference in brightness between the printing layers. To achieve this effect, however, a register-accurate application of the liquid crystal layers is necessary.

Based on that, the object of the present invention is to specify a security element of the kind cited above having high counterfeit security, and that avoids the disadvantages of the background art.

This object is solved by the security element having the features of the main claim. A method for its manufacture, a security arrangement and a valuable article having such a security element are specified in the coordinated claims. Developments of the present invention are the subject of the dependent claims.

According to the present invention, in a generic security element, a second optically active layer that is present at least in some areas is provided, the first and the second layer being stacked in an overlap area. Here, the first optically active layer selectively reflects light in a first wavelength range having a first circular polarization direction, while the second optically active layer, either itself or, in the overlap area, in coaction with the first optically active layer, selectively reflects light in a second wavelength range having a second circular polarization direction.

In this way, novel effects that exploit the light-polarizing or phase-shifting properties of the liquid crystal layers can be achieved that maintain or even improve the advantageous counterfeit security of known security elements. As explained in detail below, additive color mixing of the reflection spectra of the two optically active layers permits the production of broader and unusual color-shift effects. Also the intensity of the total reflected light can be increased by using the two opposing directions of circular polarization. Furthermore, in one or more of the liquid crystal layers, pieces of information can be encoded that permit readout only when circular polarizers are used.

In an advantageous variant of the present invention, the second direction of circular polarization of the light that the second optically active layer reflects, itself or in coaction with the first optically active layer, is opposite to the first direction of circular polarization. In a likewise advantageous variant of the present invention, the wavelength range reflected by the second optically active layer corresponds to the first wavelength range.

According to a preferred embodiment, the second optically active layer forms a phase-shifting layer. The second layer advantageously forms a λ/2 layer for light from the first wavelength range. Here, the λ/2 layer is preferably formed from nematic liquid crystal material that facilitates the manufacture of optically active layers due to the optical anisotropy of the aligned rod-shaped liquid crystals.

To weaken the effect of the λ/2 layer in some regions and/or to produce new effects, the λ/2 layer can also be formed from multiple sub-layers that are stacked and, in some areas, twisted toward one another in the layer plane. Here, the sub-layers are particularly advantageously formed by two λ/4 layers. Through different twisting of the two λ/4 sub-layers in some areas, their influence on circularly polarized light can be systematically used to produce, for example, encoded halftone images.

In the embodiments having a λ/2 layer, advantageously, a third optically active layer comprising cholesteric liquid crystal material can be provided that, like the first optically active layer, selectively reflects light in the first wavelength range having the first direction of circular polarization. Here, the λ/2 layer is disposed, at least in some areas, between the first and the third optically active layer.

According to a further preferred variant of the present invention, the second direction of circular polarization of the light that the second optically active layer reflects, itself or in coaction with the first optically active layer, corresponds to the first direction of circular polarization. In a likewise advantageous variant of the present invention, the wavelength range reflected by the second optically active layer differs from the first wavelength range.

Particularly in connection with the two last-mentioned variants of the present invention, like the first optically active layer, the second optically active layer is expediently formed from a cholesteric liquid crystal material. Here, different liquid crystals can be used for the first and second cholesteric liquid crystal layer. However, the two layers can also differ only by the helicity of the liquid crystal structure, as can be produced, for example, by using mirror-image twisters.

In all described embodiments, it can be provided that the first optically active layer reflects only light from the non-visible part of the spectrum in a first viewing direction. In contrast, the first optically active layer reflects preferably visible light of a first color in a second viewing direction. In an advantageous embodiment, also the second optically active layer reflects in a or the second viewing direction only light from the non-visible part of the spectrum. It, too, advantageously reflects visible light of a third color in a or the first viewing direction.

Altogether, then, in a particularly preferred embodiment, it can be provided that, in the appropriate viewing direction, one of the two optically active layers reflects infrared radiation as light from the non-visible part of the spectrum and the other of the two optically active layers reflects ultraviolet radiation as light from the non-visible part of the spectrum.

If the first optically active layer reflects only light from the non-visible part of the spectrum in a first viewing direction and, if applicable, visible light of a first color in a second viewing direction, then the second optically active layer can also be formed such that it reflects, in the first viewing direction, visible light of a third color and, in the second viewing direction, visible light of a fourth color that differs from the third color.

In other embodiments, the first optically active layer reflects, in a first viewing direction, visible light of a first color and, in a second viewing direction, visible light of a second color that differs from the first color. The second optically active layer can then reflect only light from the non-visible part of the spectrum in the second viewing direction and, if applicable, visible light of a third color in the first viewing direction. Alternatively, the second optically active layer reflects, in the first viewing direction, visible light of a third color that differs from the first color, and in the second viewing direction, light of a fourth color that differs from the third color.

In all embodiments, the first and/or the second and/or, if applicable, the third optically active layer can be present in the form of characters and/or patterns. Also, further optically active layers comprising nematic and/or cholesteric liquid crystal material can be provided. At least one of the optically active layers comprising cholesteric liquid crystal material and/or, if applicable, at least one layer comprising nematic liquid crystal material is expediently present in the form of pigments that are embedded in a binder matrix. Such pigments are easier to print than liquid crystals from solution and do not place such high demands on the smoothness of the background. Furthermore, the pigment-based printing inks need no alignment-promoting actions.

In a preferred embodiment, the optically active layers are disposed at least in some areas, preferably contiguously, on a dark, preferably black background. Here, the dark background can, itself, be present in the form of characters and/or patterns. In particular, it can be printed or produced by coloring a substrate or by the action of a laser beam on a substrate.

In expedient embodiments, the optically active layers and, if applicable, the dark background are present on a substrate. Here, the substrate is advantageously formed from paper or plastic.

In advantageous embodiments, the security element forms a security thread, a label or a transfer element.

The present invention also comprises a method for manufacturing a security element of the kind described, in which a first and a second optically active layer are applied to a substrate foil such that they are stacked in an overlap area, a cholesteric liquid crystal material being applied to form the first optically active layer. Here, the two optically active layers can each be applied on a separate substrate foil, especially imprinted and then laminated one on top of another. This allows, right after application to the substrate foil, the optically active layers to be checked for suitability for further processing and, if applicable, eliminated. Alternatively, the two optically active layers can also be applied successively on the same substrate foil.

The liquid crystal material can be applied from a solvent or from the melt. Furthermore, especially cholesteric liquid crystal material in paste-like form can be applied as a UV-curing cholesteric mixture, such a system neither including typical solvents nor being based on a melt or pigments, but rather including further UV-curing lacquers. Depending on the method applied, to remove the solvent, the liquid crystal material is subsequently physically dried, aligned and cured. The alignment can be done directly by the substrate foil or by so-called alignment layers, by applying shear forces, with the aid of electrostatic methods, etc. To cure the liquid crystal material, it can be crosslinked, for example by means of ultraviolet radiation or by means of electron beam (EBC). However, the liquid crystal material can also be set by adding certain additives.

Advantageously, one or, if applicable, both substrate foils are removed following the application of all optically active layers. This happens especially via separation layers or by using a laminating adhesive whose adhesion to the substrate foil is less than its adhesion with respect to the associated optically active layer.

Alternatively, to facilitate separation, to the optically active layer present on the substrate foil can be applied a contiguous auxiliary layer whose adhesion to the substrate foil is less than its adhesion with respect to the optically active layer. In this way, the laminating adhesive can be applied contiguously, and uncontrolled sticking is simultaneously prevented. Here, the auxiliary layer is advantageously a UV lacquer layer.

Advantageously, the formation of the cholesteric liquid crystal layers can happen by combining a nematic liquid crystal system with a twister. Here, the two cholesteric liquid crystal layers can be formed by combining a nematic liquid crystal system with coordinated first and second twisters, such that the liquid crystals of the first and second layer arrange themselves into mirror-image helix structures.

The present invention further includes a security arrangement for security papers, valuable articles and the like, having a security element of the kind described or a security element manufacturable according to the described method, and a separate display element that, in coaction with the security element, makes a color-shift effect and/or a polarization effect and/or a brightness effect or an intensity increase perceptible for the viewer.

In a preferred embodiment, the security element is formed without a dark background layer, while the separate display element comprises a dark, preferably black background.

In another, likewise preferred embodiment, the security element can also comprise a dark background layer. In this embodiment, the separate display element comprises a linear or circular polarizer with which the color and/or polarization effects of the security element can be made visible.

In a further preferred embodiment, the security element exhibits a layer comprising cholesteric liquid crystal material and a layer comprising nematic liquid crystal material that are stacked in an overlap area. In this embodiment, the separate display element comprises a layer comprising cholesteric liquid crystal material that, in coaction with the security element, makes an increase in intensity in some areas perceptible for the viewer.

The present invention further comprises a security arrangement for security papers, valuable articles and the like, having a security element that exhibits at least one layer comprising liquid crystal material, which layer is disposed, at least in some areas, on a transparent substrate foil, and a separate display element that, in coaction with the security element, makes a color-shift effect perceptible for the viewer and comprises a dark, preferably black background.

The present invention further comprises a valuable article, such as a branded article, a value document or the like, having a security element of the kind described above. The valuable article can especially be a security paper, a value document or a product packaging. Here, the security element is advantageously disposed in a window area of the valuable article.

Particularly preferred is a flexible valuable article in which the security element and the display element are layable one on top of another by bending or folding the valuable article for self-authentication.

Valuable articles within the meaning of the present invention include especially banknotes, stocks, identity cards, credit cards, bonds, certificates, vouchers, checks, valuable admission tickets and other papers that are at risk of counterfeiting, such as passports and other identity documents, as well as product protection elements, such as labels, seals, packaging and the like. In the following, the term "valuable article" encompasses all such articles, documents and product protection means. The term "security paper" is understood to be the not-yet-circulatable precursor to a value document, which precursor can exhibit, in addition to the security element, further authenticating features, such as luminescent substances provided in the volume. Security paper is customarily present in quasi-endless form and is further processed at a later time.

In a method for checking the authenticity of a security element, security arrangement or valuable article of the kind described above, it is checked whether a predetermined color-shift effect is present and/or whether a predetermined polarization effect is present and/or whether a predetermined brightness effect is present. The authenticity of the checked element is then assessed on the basis of the check result. Advantageously, in the check method, additionally, a piece of information encoded in the security element can be read with the aid of a linear or circular polarizer, and the authenticity of the checked element assessed on the basis of the read result.

Further exemplary embodiments and advantages of the present invention are explained below by reference to the drawings, in which a depiction to scale and proportion was omitted in order to improve their clarity.

Figure 2:
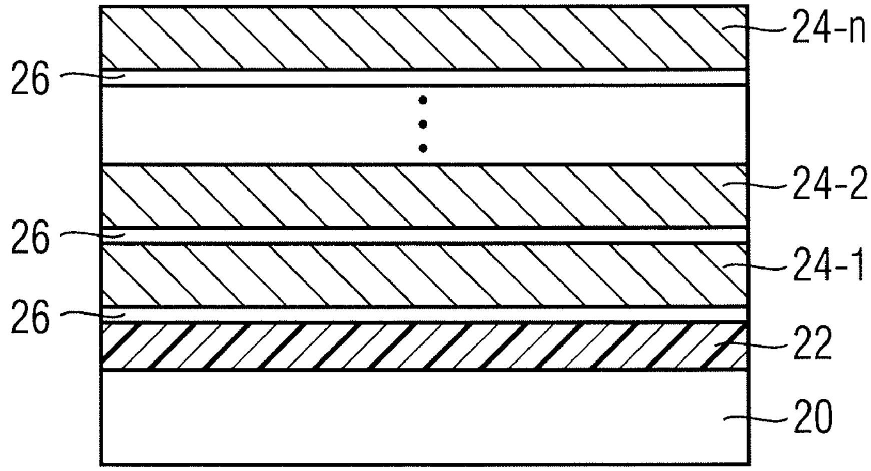
Figure 3:
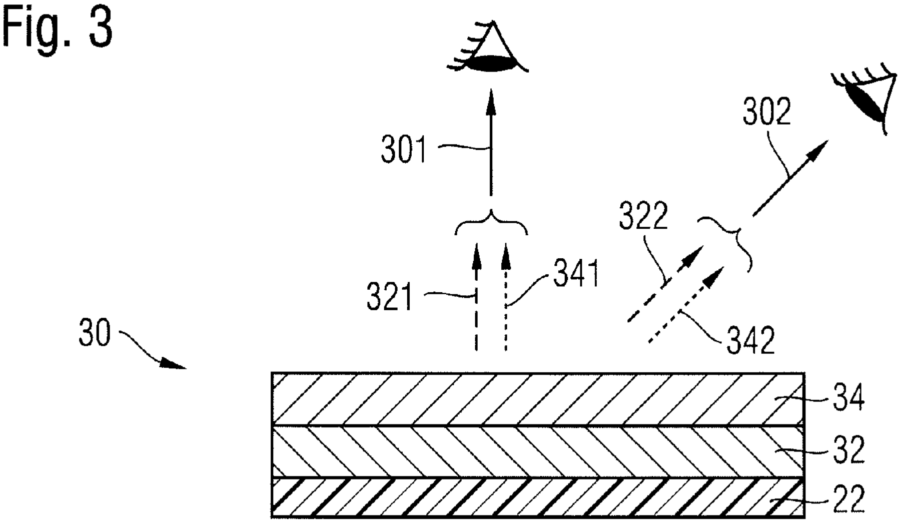
Figure 4A:
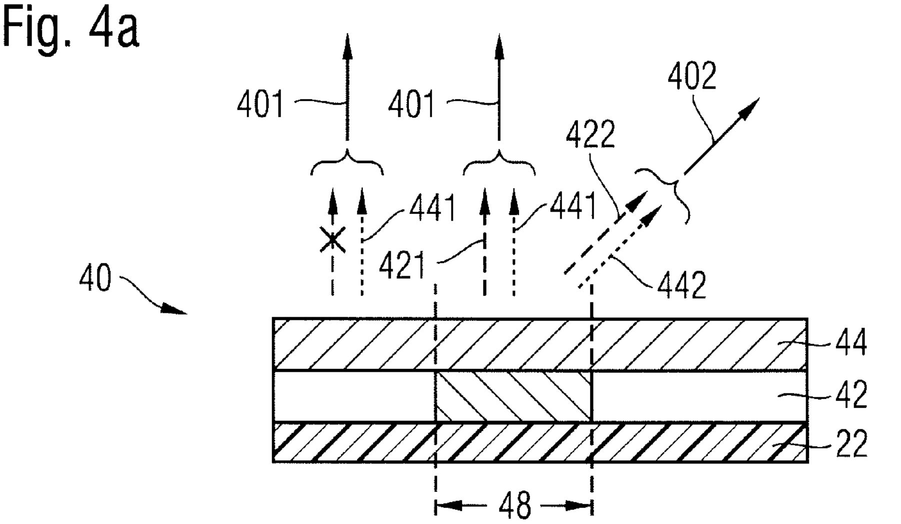
Figure 4B:
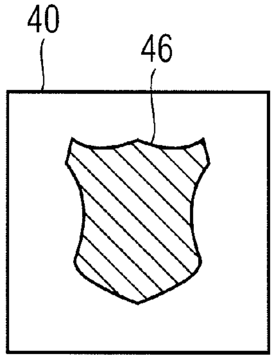
Figure 4C:
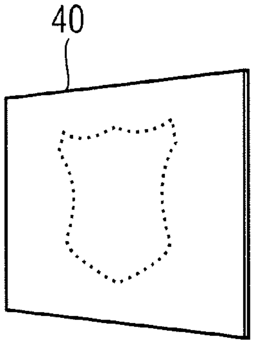
Figure 5A:
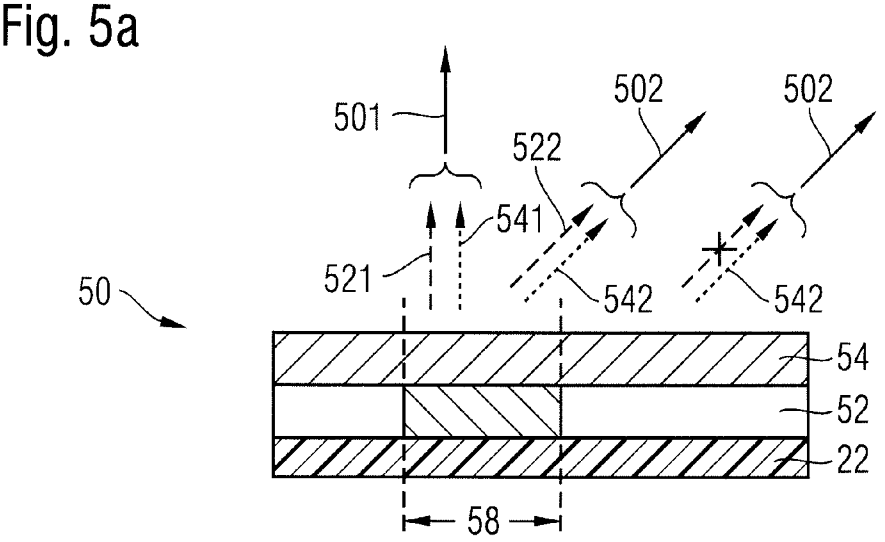
Figure 5B:
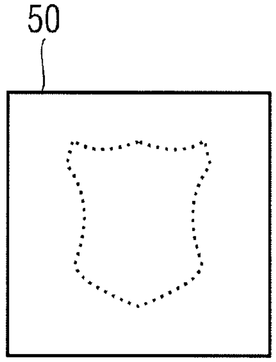
Figure 5C:
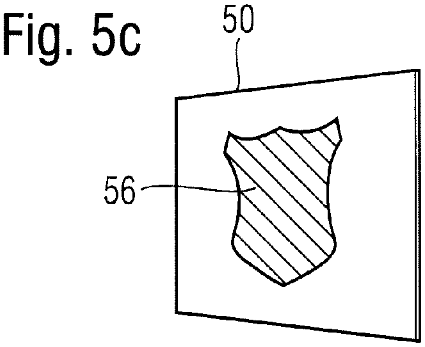
Figure 6:
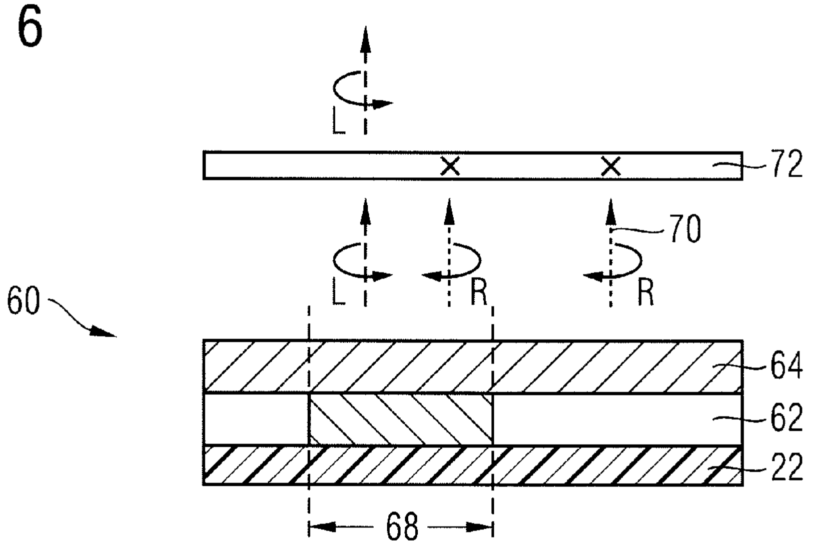
Figure 7:
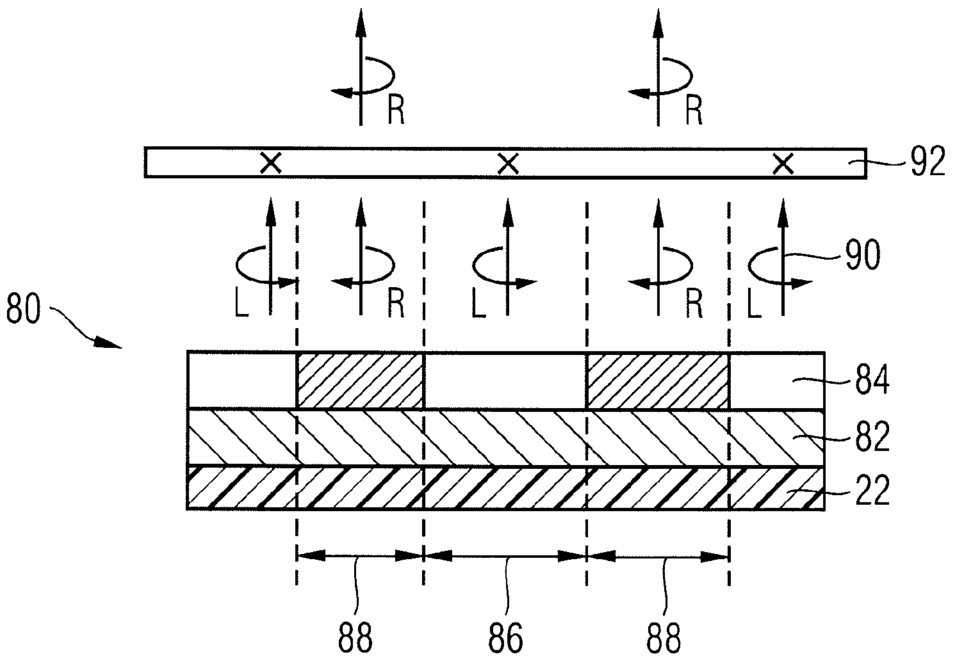
Figure 8:
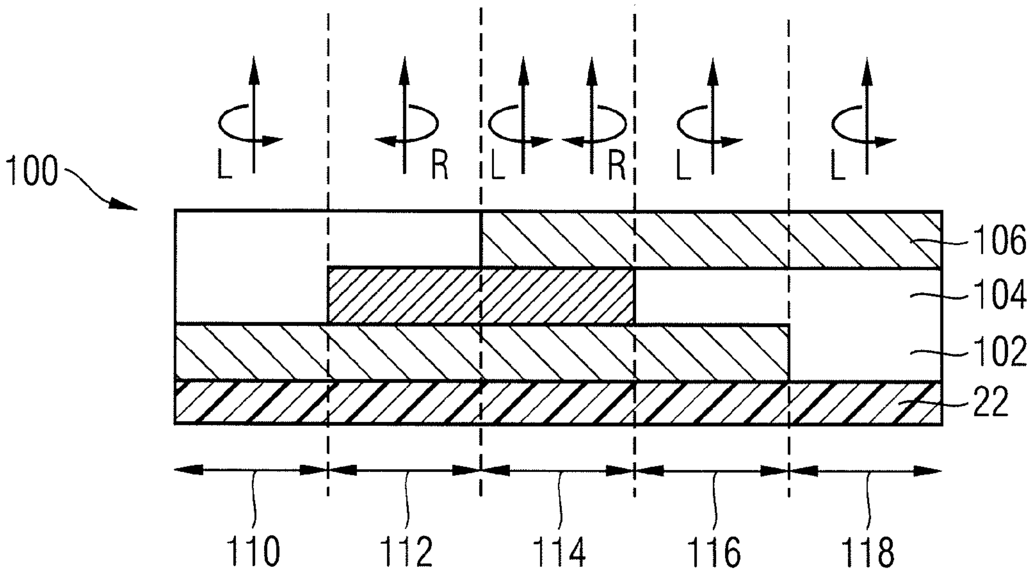
Figure 9:
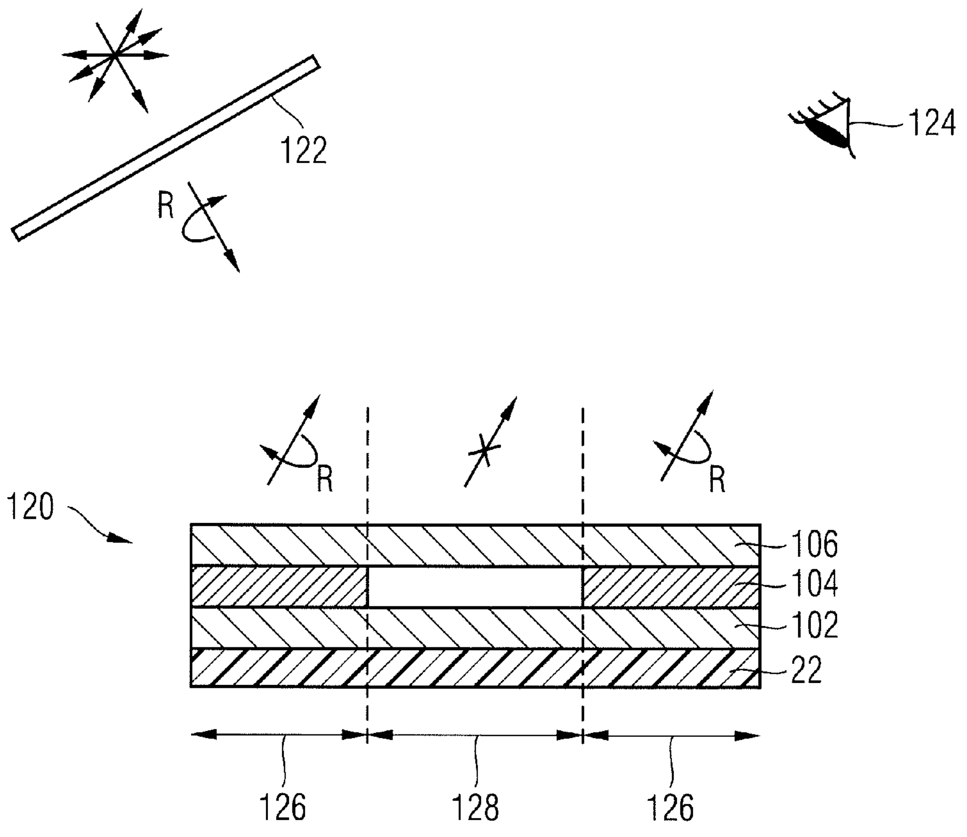
Figure 10:
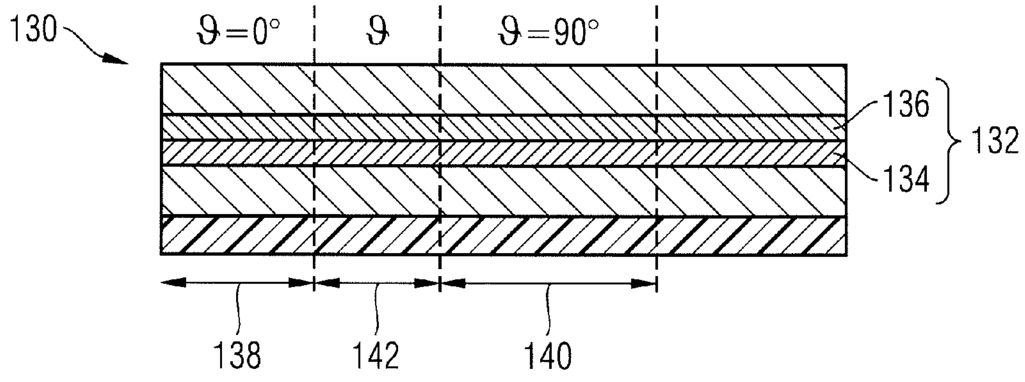
Figure 11A:
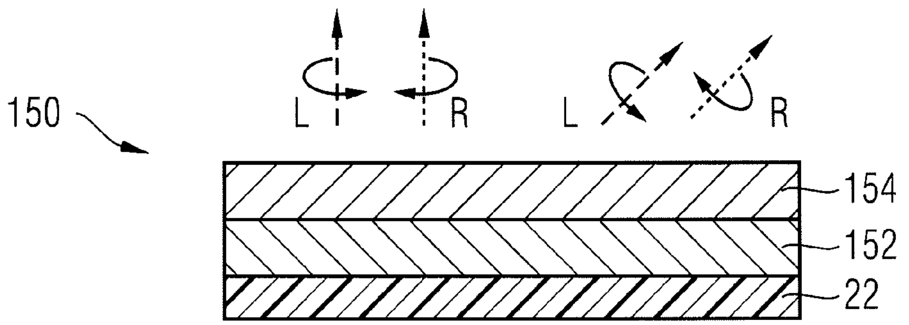
Figure 11B:
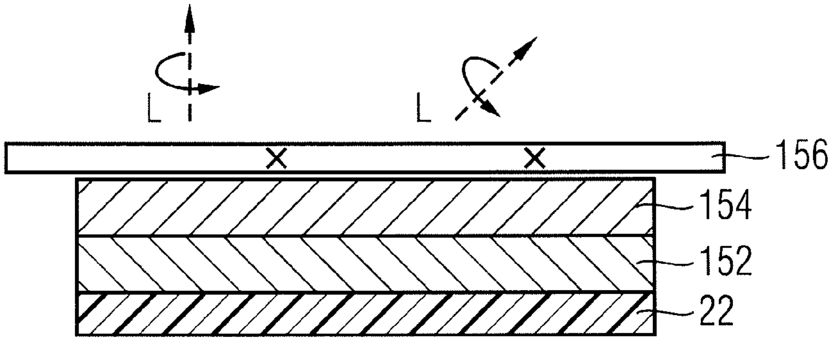
Figure 11C:
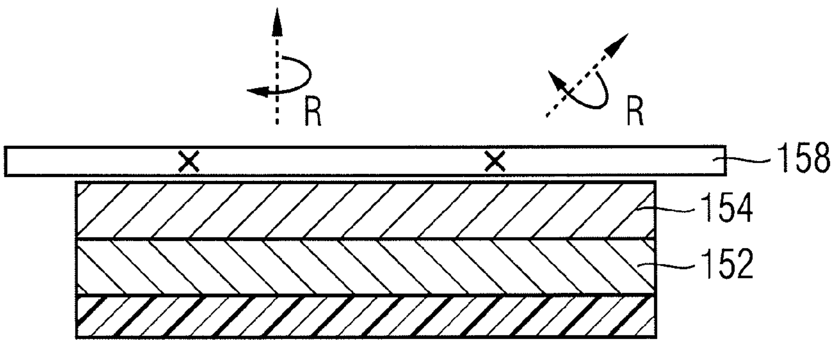
Figure 12A:
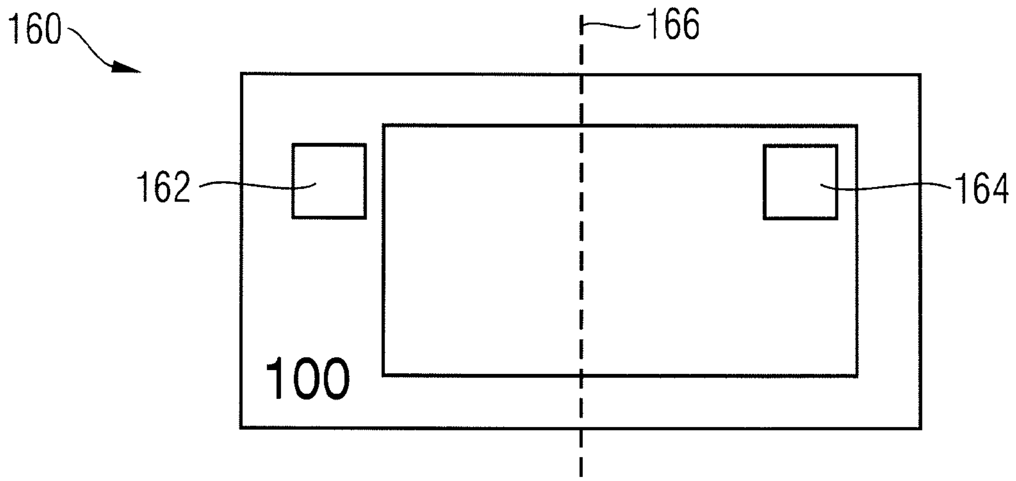
Figure 12B:
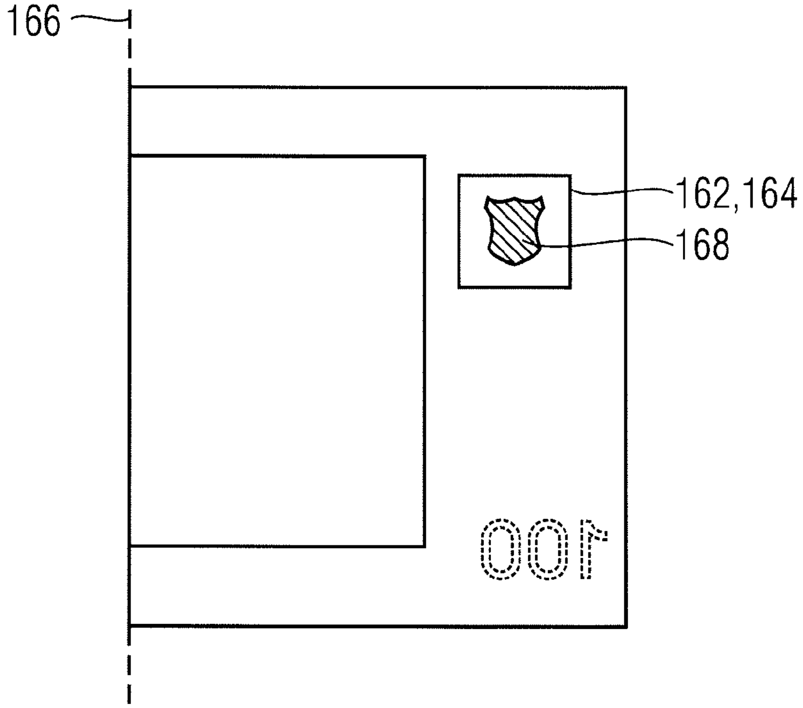

Shown are:

FIG. 1 a schematic diagram of a banknote having an embedded security thread and an affixed transfer element, each according to an exemplary embodiment of the present invention, FIG. 2 the general layer structure of a security element according to the present invention, in cross section, FIG. 3 a security element according to an exemplary embodiment of the present invention, in cross section, FIG. 4 in (*a*), the cross section of a security element according to another exemplary embodiment of the present invention, in (*b*), an aspect of this security element when viewed vertically and in (*c*) an aspect when viewed from an acute angle, FIG. 5 a diagram as in FIG. 4 of a security element according to a further exemplary embodiment of the present invention, FIG. 6 a security element according to yet a further exemplary embodiment of the present invention, having a circular polarizer for reading the encoded piece of information, FIG. 7 a diagram as in FIG. 6 of a security element according to a further exemplary embodiment of the present invention, FIG. 8 the principle of security elements having a three-layer liquid crystal structure in which a λ/2 layer is disposed between two cholesteric liquid crystal layers, FIG. 9 a security element according to the principle in FIG. 8 when illuminated with right-circularly polarized light, FIG. 10 a further security element according to the principle in FIG. 8 having a λ/2 layer broken down into two λ/4 layers, FIG. 11 a security element according to a further exemplary embodiment of the present invention, in which both the color effects and the polarization effects of the liquid crystal layers are exploited, (*a*) showing the layer structure of the security element, and (*b*) and (*c*) the situation when viewed through different circular polarizers, and FIG. 12 in (*a*), a schematic diagram of a banknote having an inventive security arrangement comprising a security element and a display element, and in (*b*), a top view of the folded banknote in (*a*) having a piece of image information made visible by laying the two elements one on top of another.

The invention will now be explained in greater detail using a banknote as an example. FIG. 1 shows a schematic diagram of a banknote 10 that exhibits two security elements 12 and 16, each of which is formed according to an exemplary embodiment of the present invention. The first security element constitutes a security thread 12 that emerges at certain window areas 14 on the surface of the banknote 10, while it is embedded in the interior of the banknote 10 in the areas lying therebetween. The second security element is formed by an affixed transfer element 16 of any shape.

FIG. 2 shows the principle layer structure of the security elements 12 and 16, in cross section. A smooth foil 20, for example a PET foil of good surface quality, is provided with an absorbent, dark background layer 22. To this background layer 22 are applied two or more, in the general case n optically active layers 24-1, 24-2, . . . 24-n comprising liquid crystal material. As described in detail below, the liquid crystal layers 24-1, 24-2, . . . 24-n can each exhibit different, but in some cases also the same, light-polarizing or phase-shifting properties.

Between the liquid crystal layers, alignment layers and/or adhesive layers 26 can be provided that serve to align the liquid crystals in the liquid crystal layers or to join the individual liquid crystal layers and compensate for surface irregularities in the background.

According to the present invention, at least one of the liquid crystal layers 24-1, 24-2, . . . 24-*n* comprises a cholesteric liquid crystal material and selectively reflects light in a first wavelength range having a first direction of circular polarization. A second layer that is stacked in an overlap area with the first layer selectively reflects, either itself or in coaction with the first layer, light in a second wavelength range having a second direction of circular polarization.

In some embodiments of the present invention, the dark background layer 22 is not part of the security element. The liquid crystal layers 24-1, 24-2, . . . 24-*n* and any alignment and adhesive layers 26 are then applied directly to the foil 20. Likewise, in some embodiments, it is advantageous to remove the foil 20 following the application of the finished security element to a valuable article, as explained in greater detail below.

FIG. 3 shows a security element 30 according to an exemplary embodiment of the present invention, in which are disposed on an absorbent, preferably black background layer 22, a first cholesteric liquid crystal layer 32 and, on this, a second cholesteric liquid crystal layer 34. Due to the interplay of the two liquid crystal layers 32 and 34, the security element 30 exhibits a novel color-shift effect that gives the viewer a color impression that changes with the viewing direction. When viewed vertically, the security element 30 in the exemplary embodiment appears to the viewer blue/violet (reflected radiation 301), while, when viewed from an acute angle, it gives a red color impression (reflected radiation 302).

This novel play of changing colors, in which the color impression of the security element changes from short-wave to longer-wave light when tilted, occurs in that the first liquid crystal layer 32 reflects blue light (arrow 321) in the vertical viewing direction and shorter-wave UV-radiation (arrow 322) in the acute-angled viewing direction. The second liquid crystal layer 34 is formed such that it reflects infrared radiation (arrow 341) in the vertical viewing direction and shorter-wave red light (arrow 342) in the acute-angled viewing direction. The two reflection portions 321 and 342 that lie outside of the visible spectral range contribute nothing to the color impression of the security element such that, when viewed vertically, a blue color impression 301 and, when viewed at an acute angle, a long-wave red color impression 302 results for the viewer.

To manufacture the security element 30, the first and the second liquid crystal layer 32 and 34 can each be imprinted on a smooth PET foil of good surface quality. Here, all printing methods that are suitable for liquid crystal layers, such as intaglio printing, flexo printing, knife coating, curtain or blade techniques may be used as the printing method.

The quality and the color spectrum of the individual layers can already be checked and, if applicable, spoilage eliminated at this production stage following the drying of the liquid crystal layers 32, 34. The liquid crystal layers 32 and 34 are then laminated onto the background layer 22 or the first liquid crystal layer 32 with the aid of commercially available laminating adhesives. Here, the smoothness of the surface influences the gloss level of the security element. Surface irregularities in the background, such as can occur in the structure of a typical security thread 12, can be compensated for by the laminating adhesive such that a good gloss can also be achieved for such security elements.

Following the gluing of the liquid crystal layers 32 and 34, the substrate foils can be removed. This can occur, for example, via so-called separation or release layers. These are especially UV lacquers or waxes that can be mechanically or thermally activated. When separation layers are used, they can be patterned on the surface to locally promote or prevent alignment of the liquid crystals upon application. Through different alignment of the liquid crystals in some areas, motifs such as characters or patterns can be introduced into the liquid crystal layers, also in contiguous application.

Expediently, if no separation layer is provided, then to prevent a foil tear, a laminating adhesive is chosen whose adhesion to the substrate foil is less than its adhesion to the liquid crystal layer. Also, to facilitate separation, the adhesion of the liquid crystals to the substrate foil must be less than the adhesion of the adhesive to the liquid crystals. Further, the adhesion of the adhesive to the layer to which the system is to be transferred must be better than the adhesion of the liquid crystals to the substrate foil. Furthermore, it must also be better than the adhesion of the adhesive to the substrate foil. The preceding requirements for the laminating adhesive are especially important when the liquid crystal layer to be transferred is not formed contiguously.

After the first liquid crystal layer 32 is laminated onto the background 22, the second liquid crystal layer 34 is analogously laminated onto the first liquid crystal layer 32 now lying on top in the composite.

In FIG. 3, as well as in the exemplary embodiments described below, the liquid crystal layers can each be laminated one on top of another, printed one on top of another or otherwise applied one on top of another, with, if applicable, alignment layers or adhesive layers that are not depicted being able to be provided between the layers.

A further exemplary embodiment of the present invention is depicted schematically in FIG. 4. In the security element 40, a first cholesteric liquid crystal layer 42 and, on this, a second cholesteric liquid crystal layer 44 are applied on an absorbent, preferably black background layer 22. As shown in FIG. 4(*b*), the first liquid crystal layer 42 is applied to the background 22 only in some areas and, by the shape or the outline of the applied areas, forms a motif, in the exemplary embodiment a crest 46. The second liquid crystal layer 44 is applied contiguously to the first liquid crystal layer 42 or to the uncovered areas on the background layer 22.

The two liquid crystal layers are coordinated such that, when the security element is viewed vertically (FIG. 4(*b*)), the crest motif 46 is clearly perceptible for the viewer, and disappears when the security element 40 is tilted, that is, upon transition from a vertical to an acute-angled view, as indicated by the dotted outline in FIG. 4(*c*). The disappearance of the crest motif 46 is achieved in that, when tilted, the liquid crystal layer 42 applied in some areas displays a color-shift effect from blue (arrow 421) to ultraviolet (arrow 422), while the second liquid crystal layer 44 exhibits a color-shift effect that changes between two colors of the visible spectral range, and varies for example between red (arrow 441) and green (arrow 442).

Thus, in the overlap area 48 of the two layers, when the security element 40 is viewed vertically, a color impression 401 results that is given by the additive color mixing of the blue light 421 of the first liquid crystal layer 42 and of the red light 441 of the second liquid crystal layer 44, while outside the overlap area, only the red color impression of the second liquid crystal layer 44 is perceptible. Due to the color contrast in the reflected light 401, the crest motif 46 stands out clearly for the viewer.

If the viewer now tilts the security element 40 such that he sees it at an acute angle, then, in the overlap area 48, the first liquid crystal layer 42 reflects to the viewer only ultraviolet light lying outside of the visible spectral range. Thus, the liquid crystal layer 42 does not contribute to the color impression 402 of the security element 40, either in the overlap area 48 or outside of the overlap area. At an acute viewing angle, the motif is thus not perceptible, and the viewer has the impression that the crest motif 46 disappears when the security element 40 is tilted out of the vertical.

Analogously, a security element 50 can be produced having a motif that appears when tilted, as illustrated in FIG. 5. For this, the liquid crystal layer 52 that is applied in some areas is formed such that, when tilted, it displays a color-shift effect from infrared (arrow 521) to red (arrow 522). The second liquid crystal layer 54 again displays a color-shift effect between two colors of the visible spectral range, and varies for example between teal (arrow 541) and violet (arrow 542).

In this combination, the motif 56 is not perceptible when viewed vertically in the reflected light 501 since, from the first liquid crystal layer 52, at most non-visible infrared radiation is reflected in the vertical viewing direction. Only when the security element 50 is tilted does the motif become perceptible for the viewer, since the first liquid crystal layer 52 then reflects red light to the viewer, and the motif 56 thus stands out in the reflected light 502 from the violet color impression outside of the overlap area 58.

FIGS. 6 to 11 show further exemplary embodiments of the present invention, in which, in addition to the color-shift effect, above all the particular light-polarizing properties of the liquid crystal layers are exploited. In these figures, the polarization direction of the light is indicated by additional arrow symbols at the propagation vectors of the light. As usual, a circular polarization in which the circular movement of the electric field intensity vector is clockwise from the perspective of a viewer toward whom the light wave flows is referred to as right-circular polarization, and the opposite polarization as left-circular polarization.

The security element 60 in FIG. 6 includes two cholesteric liquid crystal layers 62 and 64 that are applied on a dark background layer 22. The two liquid crystal layers 62 and 64 exhibit the same color reflection spectrum, but differ in the orientation of the reflected circular polarization. While the first liquid crystal layer 62 in the exemplary embodiment reflects left-circularly polarized light, the second liquid crystal layer 64 reflects right-circularly polarized light. Left-circularly polarized light, in contrast, is transmitted by the second liquid crystal layer 64 without significant absorption. It is understood that the indicated polarization directions are for illustration purposes only and, in the context of the present invention, can, of course, also be chosen differently.

One such opposite selective reflection can be achieved, for example, in that the two cholesteric liquid crystal layers 62 and 64 are produced from the same nematic liquid crystal system using mirror-image twisters. In this way, a mirror-image helix-like arrangement of the rod-shaped liquid crystal molecules can be achieved in the two liquid crystal layers such that one layer reflects right- and the other layer left-circularly polarized light. The color of the light reflected by the liquid crystal layers depends, as in the above-described exemplary embodiments, on the viewing direction, and changes upon the transition from vertical to acute-angled viewing, for example from red to green.

In the exemplary embodiment in FIG. 6, the first liquid crystal layer 62 is present only in some areas in the form of a motif, for example lettering, or of a pattern. If the security element 60 is viewed without auxiliary means, primarily the color-shift effect of the second liquid crystal layer 64 appears. In the overlap area 68 of the two layers, the motif is perceptible with the same color impression, but an increased brightness compared with its surroundings since, in the overlap area 68, light of both directions of circular polarization is reflected, while outside, only right-circularly polarized light is reflected, as shown by the arrows 70 of the reflected light.

If the security element 60 is now viewed through a circular polarizer 72 that transmits only left-circularly polarized light, then the motif formed by the first liquid crystal layer 62 stands out with a strong brightness contrast, since the circular polarizer 72 completely blocks out the right-circularly polarized light reflected by the second liquid crystal layer 64. Such a circular polarizer 72 can be formed, for example, by a linear polarizer and a following λ/4 plate.

It is understood that, analogously, the second liquid crystal layer 64 or also both liquid crystal layers 62, 64 can be present in the form of motifs. Accordingly, a motif in the second liquid crystal layer 64 can be made clearly visible with the aid of a circular polarizer that transmits right-circularly polarized light. The motifs in one or both layers can easily be shown with a viewing device that includes both polarizer types.

The exemplary embodiment in FIG. 7 shows a security element 80 having a first cholesteric liquid crystal layer 82 and a λ/2 layer 84 that is applied in some areas on the liquid crystal layer 82 and includes nematic liquid crystals. Due to the different refractive indices of the rod-shaped liquid crystals along the principal crystal axes, is it possible to use nematic liquid crystals to manufacture optically active layers. Given an appropriately chosen layer thickness, a λ/2 layer is obtained for the wavelength range in which the first liquid crystal layer 82 selectively reflects.

In the areas 86 not covered by the λ/2 layer 84, the first liquid crystal layer 82 reflects light having a preselected direction of circular polarization, for example left-circularly polarized light. In the overlap area 88 of the two layers, the security element 80 reflects light having the opposite polarization direction, so right-circularly polarized light in the exemplary embodiment, since the incident unpolarized light is not influenced by the λ/2 layer 84, but the polarization direction of the left-circularly polarized light reflected by the first liquid crystal layer 82 is exactly reversed in its polarization orientation by the λ/2 layer 84 due to the phase difference between the ordinary and the extraordinary ray.

Without auxiliary means, the motif formed by the λ/2 layer 84 is hardly perceptible, since the security element reflects substantially the same amount of light in the covered areas as in the uncovered areas, and the unarmed eye cannot differentiate the light's direction of circular polarization.

If, in contrast, the security element 80 is viewed through a circular polarizer 92 that transmits only right-circularly polarized light, then the motif formed in the λ/2 layer 84 stands out in clear contrast. Here, the image portions 88 covered by the λ/2 layer 84 appear light, and the uncovered image portions 86, dark. A reversed (negative) image impression results when a circular polarizer is used that transmits only left-circularly polarized light. As described above, the circular polarizer 92 can be formed, for example, by a linear polarizer having a downstream λ/4 plate.

To manufacture the security element 80, a nematic liquid crystal layer can first be imprinted in the form of a motif on a smooth PET foil of good surface quality in a layer thickness that is chosen such that a λ/2 layer is obtained for the wavelength range in which the first liquid crystal layer 82 selectively reflects. After physical drying to remove the solvent, the liquid crystal layer is crosslinked by means of ultraviolet radiation. A layer comprising cholesteric liquid crystal material is subsequently imprinted contiguously on the PET foil coated in some areas with nematic liquid crystal material. After physical drying, this layer, too, is crosslinked by means of ultraviolet radiation. With the aid of commercially available laminating adhesives, the two-layer liquid crystal structure produced in this way is then laminated, via the cholesteric liquid crystal layer now lying on top, onto the background layer 22, which forms an absorbent background. Such an absorbent background can be provided, for example, by a security thread that can exhibit yet further security elements.

Finally, following gluing, the substrate foil can be removed. This can occur, for example, via separation layers. These are especially UV lacquers or waxes that can be mechanically or thermally activated. If no separation layer is provided, then the contiguously imprinted cholesteric liquid crystal layer can serve as an auxiliary layer between the laminating adhesive and the PET foil and so prevent the foil tear that is otherwise possible upon removal of the PET foil and that can especially occur when transferring non-contiguous layers. A contiguously applied auxiliary layer comprising a UV lacquer or another suitable material that allows easy removal from the substrate foil can also assume the same assist function. Since the contiguous application prevents, among other things, uncontrolled sticking by the laminating adhesive, the laminating adhesive can be imprinted contiguously.

In further exemplary embodiments of the present invention, the security element exhibits a three-layer liquid crystal structure in which a λ/2 layer is disposed between two cholesteric liquid crystal layers having the same light-polarizing properties. The principle of these exemplary embodiments will now be explained with reference to FIG. 8.

The security element 100 exhibits, applied on a dark, preferably black background layer 22, a layer sequence that comprises a first cholesteric liquid crystal layer 102, a λ/2 layer 104 and a second cholesteric liquid crystal layer 106. The light-polarizing properties of the first and second liquid crystal layer 102 and 106 are identical, such that the two layers in themselves reflect light in the same preselected wavelength range and having the same preselected direction of circular polarization. All layers can be applied contiguously or also only in some areas, to form different or complementary motifs such as characters or patterns.

The reflection properties of the various possible layer sequences are exemplified in FIG. 8. Here, it is assumed that the two cholesteric liquid crystal layers 102 and 106 reflect left-circularly polarized light and the illumination of the security element occurs with unpolarized light.

In a first area 110 in which only the first liquid crystal layer 102 is present, left-circularly polarized light is reflected. In a second area 112 in which the first liquid crystal layer 102 is covered by the λ/2 layer 104, the security element reflects, as already explained in connection with FIG. 7, right-circularly polarized light. In a third area 114 in which all three layers are present, the upper liquid crystal layer 106 reflects left-circularly polarized light and transmits right-circularly polarized light. The transmitted light is converted by the λ/2 layer 104 into left-circularly polarized light that is then reflected by the first liquid crystal layer 102. The reflected light is converted by the λ/2 layer 104 back into right-circularly polarized light that is transmitted by the second liquid crystal layer 106. Thus, in addition to left-circularly polarized light, the layer sequence 102, 104, 106 also reflects right-circularly polarized light, as depicted in FIG. 8.

In the fourth area 116 in which only the two cholesteric liquid crystal layers 102 and 106 are present, the upper liquid crystal layer 106 reflects left-circularly polarized light. The transmitted right-circularly polarized light is likewise transmitted by the lower liquid crystal layer 102 and absorbed in the background layer 22. Thus, in this area, the security element reflects only left-circularly polarized light. The same is true for the fifth area 118 in which the second liquid crystal layer 106 is present alone.

The numerous variation possibilities resulting from the different layer sequences permit a number of application possibilities for security elements, of which only a few will be exemplified in greater detail.

The security element 120 in FIG. 9 exhibits, like the above-described security element 100 in FIG. 8, applied on a black background layer 22, a layer sequence comprising a first cholesteric liquid crystal layer 102, a λ/2 layer 104 and a second cholesteric liquid crystal layer 106. In this exemplary embodiment, merely the λ/2 layer 104 is formed in the shape of a motif, while the first and second liquid crystal layer 102 and 106 are applied contiguously.

Upon normal illumination with unpolarized light, the motif of the λ/2 layer 104 does appear with the same color impression as its surroundings, but due to the reflection of both the left-circularly and the right-circularly polarized light, it is perceptible in the areas 126 even without auxiliary means due to the substantially double amount of light reflected. Furthermore, if the security element 120 is illuminated with right-circularly polarized light via a circular polarizer 122, then the motif appears in strong contrast for the viewer 124 without further auxiliary means, since the right-circularly polarized light is reflected in the areas 126 in which all three layers overlap, while it is transmitted in areas 128 without λ/2 layer 104 by the upper and lower liquid crystal layer 106 and 102, and absorbed in the black background layer 22.

FIG. 10 shows a security element 130 according to a further exemplary embodiment of the present invention that, as regards its layer sequence, is structured substantially like the security element 120 in FIG. 9. In contrast to the security element described there, the intermediate layer 132 of the security element 130 is composed of two λ/4 sub-layers 134 and 136 that can be twisted toward one another locally in their orientation in the layer plane.

If, in a sub-area 138, the sub-layers 134 and 136 are untwisted, that is, stacked at a rotation angle $\theta=0°$, then together they form a λ/2 layer that, like the λ/2 layer 104 in the exemplary embodiment in FIG. 9, ensures that, in the sub-area 138, right-circularly polarized light is reflected by the layer sequence. In another sub-area 140, the two λ/4 layers 134 and 136 are applied twisted toward each other in their orientation by a rotation angle of $\theta=90°$, such that their effect on incident circularly polarized light is just neutralized. In the sub-area 140—analogously to the sub-area 128 in FIG. 9—right-circularly polarized light is thus transmitted by the layer sequence and, finally, absorbed by the background layer 22.

If, in a sub-area 142, the two λ/4 layers 134 and 136 are twisted toward each other in their orientation by an angle of rotation θ between 0° and 90°, then the intermediate layer 132 causes a certain portion of right-circularly polarized light to be reflected by the layer sequence. The size of the reflected portion decreases continuously with increasing angle of rotation. Through a different angle of rotation θ in different surface areas of the intermediate layer 132, it is possible to encode in the security element, for example, halftone motifs that hardly appear when illuminated with unpolarized light, but that appear for the viewer without further auxiliary means as grayscale images when illuminated with circularly polarized light.

It is understood that, analogously, the λ/2 layer can, of course, likewise be substituted by two λ/4 sub-layers also in layer sequences that exhibit no second cholesteric liquid crystal layer, as shown for example in the exemplary embodiment in FIG. 7. Furthermore, these λ/4 sub-layers can be twisted toward each other locally in their orientation in the layer plane.

FIG. 11 shows an exemplary embodiment in which both the color effects and the polarization effects of the liquid crystal layers are exploited. FIG. 11(*a*) shows the structure of a security element 150 having an absorbent background layer 22, a first cholesteric liquid crystal layer 152 and a second cholesteric liquid crystal layer 154 applied thereon.

The first liquid crystal layer 152 exhibits a first color-shift effect, for example from green to blue, and in addition, reflects only light of a preselected direction of circular polarization, for example right-circularly polarized light. The second liquid crystal layer 154 exhibits a second color-shift effect, for example from magenta to green, and in addition, reflects only light of the direction of circular polarization opposite to the first liquid crystal layer, in the exemplary embodiment, left-circularly polarized light. If the security element 150 is viewed when illuminated with unpolarized light and without auxiliary means, then the two color-shift effects overlap due to additive color mixing of the reflected light.

If the security element 150 is viewed through a circular polarizer 156 that transmits only right-circularly polarized light, then it is possible to observe the color-shift effect of the first liquid crystal layer 152 alone when the security element is tilted, as illustrated in FIG. 11(*b*). In contrast, through a circular polarizer 158 that transmits only left-circularly polarized light, only the color-shift effect of the second liquid crystal layer 154 appears, as depicted in FIG. 11(*c*). It is understood that each of the liquid crystal layers 152, 154 can also be substituted by a combination of a λ/2 layer with a cholesteric layer that is the mirror-image of the original layer.

The principles of the exemplary embodiments described can also be used for self-authenticating security arrangements on any data carriers. For exemplification, FIG. 12 shows a banknote 160 that is furnished with a two-part security arrangement comprising a security element 162 and a display element 164. The security element 162 and the display element 164 are disposed on the banknote 160 such that they come to rest one on top of another when the banknote is folded along the centerline 166, as depicted in FIG. 12(*b*). It is understood that such an arrangement of the security element 162 and the display element 164 is not compulsory, and that the elements 162, 164 can, of course, also be disposed at other locations on the banknote 160, as long as it is ensured that they come to rest one on top of another when the banknote is folded.

In one exemplary embodiment, the security element 162 comprises a layer sequence comprising cholesteric and/or nematic liquid crystal layers applied on a transparent foil, as depicted in FIG. 2, albeit without the dark background layer 22. The layers can be applied contiguously or also only in some areas, to form different or complementary motifs. Also the layer sequence as such can be present on the transparent foil in the form of a motif. The security element 162 is present in a window, manufactured with papermaking technology or diecut, of the banknote 160 and, in the unfolded state of the banknote, appears substantially transparent and inconspicuous in reflected light or transmitted light.

In this exemplary embodiment, the dark background layer, which is essential for the perceptibility of the color or polarization effects described, is provided by the separate display element 164 and can be formed, for example, by a commercially available printing ink imprinted on one side of the banknote. Only when the banknote, as in FIG. 12(*b*), is folded such that the security element 162 comes to rest on the display element 164 can the color and/or polarization effects provided be perceived. In the exemplary embodiment, after the banknote 160 is folded, a crest motif 168 that was not previously perceptible appears. It is understood that a motif can likewise be present in the display element 164, especially in addition to the motif in the security element 162, the two motifs, if applicable, being able to complement each other and thereby form a code.

In other embodiments according to the present invention, the security element 162 is present as one of the above-described security elements including the dark background layer 22, and the display element 164 includes a circular polarizer that is formed by, for example, a linear polarizer and a downstream λ/4 plate. For the motifs introduced into the security element 162, the above-described perception mechanisms when viewed through a circular polarizer can then be realized by folding the banknote 160 such that the user can, without additional auxiliary means, perform a self-authentication of the security element and thus of the banknote 160.

In a further exemplary embodiment according to the present invention, the security element 162 comprises, as depicted in FIG. 7, applied on a dark background layer, a layer sequence that comprises a first cholesteric liquid crystal layer and, applied in some areas thereon, a λ/2 layer that includes nematic liquid crystals. Here, the security element 162 can be formed, for example, by an affixed transfer element or a security thread. In the unfolded state of the banknote, the security element 162 displays substantially only a color-shift effect in reflected light. The motif formed by the λ/2 layer, in contrast, is hardly perceptible.

The display element 164 is present in a window, manufactured with papermaking technology or diecut, of the banknote 160 and comprises, applied on a transparent foil, a cholesteric liquid crystal layer whose light-polarizing properties are identical to those of the first cholesteric liquid crystal layer of the security element 162. In particular, the two layers, in themselves, reflect light in the same preselected wavelength range and having the same preselected direction of circular polarization. In the unfolded state of the banknote, the display element 164 appears substantially transparent and inconspicuous in reflected light or transmitted light.

If the banknote is folded such that the display element 164 comes to rest on the security element 162 in such a way that the cholesteric liquid crystal layer of the display element 164 directly adjoins the security element 162, the effects described in connection with FIGS. 8 and 9 can be observed. In particular, upon normal illumination with unpolarized light, due to the reflection of light of both directions of circular polarization, the motif of the λ/2 layer exhibits an increased brightness compared with its surroundings and is thus perceptible without further auxiliary means. A motif that previously was hardly or not at all perceptible then appears clearly.

In a further exemplary embodiment that is not depicted, the security element comprises a liquid crystal layer applied on a transparent foil. The security element, just like the security element of the self-authenticating security arrangement depicted in FIG. 12, is present in a window manufactured with papermaking technology or diecut, for example in a banknote. The liquid crystal layer applied in some areas in the form of a motif appears transparent and inconspicuous both in reflected light and in transmitted light, and is substantially not differentiable from the surrounding transparent foil. Through a separate display element that is disposed in another location on the banknote such that the security element comes to rest thereon when the banknote is folded, the color-shift effects that are typical for liquid crystals can be made visible by providing a dark, preferably black background layer. Such a background layer can be provided, for example, by printing one side of the banknote with a commercially available printing ink.

The exemplary embodiments for the self-authenticating security arrangement can, of course, also be provided on a document comprising plastic, such as a plastic banknote. Here, the transparent window is preferably formed by an area of the document that is not printed on.

The invention claimed is:

1. A security element for securing valuable articles, having a first optically active layer that is present in at least some areas and comprises cholesteric liquid crystal material, and a second optically active layer that is present in at least some areas, the first and the second layer being stacked in an overlap area, characterized in that the first optically active layer selectively reflects light in a first wavelength range having a first direction of circular polarization, the second optically active layer, either itself or, in the overlap area, in coaction with the first optically active layer, selectively reflects light in a second wavelength range having a second direction of circular polarization, that the second optically active layer forms a phase-shifting layer, that the second optically active layer forms a λ/2 layer for light from the first wavelength range and that the second optically active layer is present in the form of characters and/or patterns.

2. The security element according to claim 1, characterized in that the second wavelength range in which the second optically active layer reflects, itself or in coaction with the first optically active layer, corresponds to the first wavelength range.

3. The security element according to claim 1, characterized in that the second optically active layer is formed from nematic liquid crystal material.

4. The security element according to claim 1, characterized in that the λ/2 layer is formed from multiple sub-layers that are stacked and, in some areas, twisted toward one another in the layer plane.

5. The security element according to claim 1, characterized in that the multiple sub-layers are formed by two λ/4 layers.

6. The security element according to claim 1, characterized in that a third optically active layer comprising cholesteric liquid crystal material is provided that selectively reflects light in the first wavelength range having the first direction of circular polarization, and in that the phase-shifting layer is disposed, at least in some areas, between the first and the third optically active layer.

7. The security element according to claim 1, characterized in that the first optically active layer reflects only light from the non-visible part of the spectrum in a first viewing direction.

8. The security element according to claim 7, characterized in that the first optically active layer reflects visible light of a first color in a second viewing direction.

9. The security element according to claim 7, characterized in that one of the two optically active layers reflects infrared radiation as light from the non-visible part of the spectrum and the other of the two optically active layers reflects ultraviolet radiation as light from the non-visible part of the spectrum in the appropriate viewing direction.

10. The security element according to claim 7, characterized in that the second optically active layer reflects, in the first viewing direction, visible light of a third color and, in the second viewing direction, visible light of a fourth color that differs from the third color.

11. The security element according to claim 1, characterized in that the second optically active layer reflects only light from the non-visible part of the spectrum in a or the second viewing direction.

12. The security element according to claim 11, characterized in that the second optically active layer reflects visible light of a third color in a or the first viewing direction.

13. The security element according to claim 1, characterized in that the first optically active layer reflects, in a first viewing direction, visible light of a first color and, in a second viewing direction, visible light of a second color that differs from the first color.

14. The security element according to claim 13, characterized in that the second optically active layer reflects, in the first viewing direction, visible light of a third color that differs from the first color, and in the second viewing direction, light of a fourth color that differs from the third color.

15. The security element according to claim 1, characterized in that the first optically active layer is present in the form of characters and/or patterns.

16. The security element according to claim 1, characterized in that the second direction of circular polarization of the light that the second optically active layer reflects, itself or in coaction with the first optically active layer, is opposite to the first direction of circular polarization.

17. The security element according to claim 1, characterized in that the optically active layers are disposed at least in part on a dark and/or black background.

18. The security element according to claim 17, characterized in that the optically active layers are disposed contiguously on the dark and/or black background.

19. The security element according to claim 17, characterized in that the dark and/or black background is present in the form of characters and/or patterns.

20. The security element according to claim 17, characterized in that the dark and/or black background is printed or produced by coloring a substrate or by the action of a laser beam on a substrate.

21. A method for manufacturing a security element according to claim 1, in which a first and a second optically active layer are applied to a substrate foil such that they are stacked in an overlap area, a cholesteric liquid crystal material being applied to form the first optically active layer, and wherein the second optically active layer is provided in the form of a phase-shifting layer, namely a λ/2 layer for light from the first wavelength range, and is provided in the form of characters and/or patterns.

22. The method according to claim 21, characterized in that, following the application of all optically active layers, the substrate foil is removed.

23. The method according to claim 21, characterized in that, following the application of all optically active layers, the substrate foil is removed, via an auxiliary layer that is applied contiguously to the optically active layer and whose adhesion to the substrate foil is less than its adhesion to the optically active layer, and in that the auxiliary layer is formed by a UV lacquer layer.

24. A security arrangement for security papers, valuable articles and the like, having:

- a security element for securing valuable articles, having a first optically active layer that is present in at least some areas and comprises cholesteric liquid crystal material, and a second optically active layer that is present in at least some areas, the first and the second layer being stacked in an overlap area, characterized in that the first optically active layer selectively reflects light in a first wavelength range having a first direction of circular polarization, the second optically active layer, either itself or, in the overlap area, in coaction with the first optically active layer, selectively reflects light in a second wavelength range having a second direction of circular polarization, that the second optically active layer forms a phase-shifting layer, that the second optically active layer forms a λ/2 layer for light from the first wavelength range and that the second optically active layer is present in the form of characters and/or patterns; or,
- a security element manufacturable according to a method in which a first and a second optically active layer are applied to a substrate foil such that they are stacked in an overlap area, a cholesteric liquid crystal material being applied to form the first optically active layer, and wherein the second optically active layer is provided in the form of a phase-shifting layer, namely a λ/2 layer for light from the first wavelength range, and is provided in the form of characters and/or patterns; and a separate display element that, in coaction with the security element or the security element so manufacturable, makes a color shift effect and/or a polarization effect and/or a brightness effect perceptible for the viewer.

25. The security arrangement according to claim 24, characterized in that the display element comprises a dark and/or black background.

26. The security arrangement according to claim 24, characterized in that the display element comprises a linear or circular polarizer.

27. A valuable article, such as a branded article, value document or the like, having a security arrangement according to claim 24.

28. The valuable article according to claim 27, characterized in that the valuable article is flexible such that the security element and the display element are layable on top of one another by bending or folding the valuable article for self-authentication.

29. A valuable article, such as a branded article, value document or the like, having:

a security element for securing valuable articles, having a first optically active layer that is present in at least some areas and comprises cholesteric liquid crystal material, and a second optically active layer that is present in at least some areas, the first and the second layer being stacked in an overlap area, characterized in that the first optically active layer selectively reflects light in a first wavelength range having a first direction of circular polarization, the second optically active layer, either itself or, in the overlap area, in coaction with the first optically active layer, selectively reflects light in a second wavelength range having a second direction of circular polarization, that the second optically active layer forms a phase-shifting layer, that the second optically active layer forms a λ/2 layer for light from the first wavelength range and that the second optically active layer is present in the form of characters and/or patterns; or, a security element manufacturable according to a method in which a first and a second optically active layer are applied to a substrate foil such that they are stacked in an overlap area, a cholesteric liquid crystal material being applied to form the first optically active layer, and wherein the second optically active layer is provided in the form of a phase-shifting layer, namely a λ/2 layer for light from the first wavelength range, and is provided in the form of characters and/or patterns.

30. A method for checking the authenticity of:

a security element for securing valuable articles, having a first optically active layer that is present in at least some areas and comprises cholesteric liquid crystal material, and a second optically active layer that is present in at least some areas, the first and the second layer being stacked in an overlap area, characterized in that the first optically active layer selectively reflects light in a first wavelength range having a first direction of circular polarization, the second optically active layer, either itself or, in the overlap area, in coaction with the first optically active layer, selectively reflects light in a second wavelength range having a second direction of circular polarization, that the second optically active layer forms a phase-shifting layer, that the second optically active layer forms a λ/2 layer for light from the first wavelength range and that the second optically active layer is present in the form of characters and/or patterns;

a security element manufacturable according a method in which a first and a second optically active layer are applied to a substrate foil such that they are stacked in an overlap area, a cholesteric liquid crystal material being applied to form the first optically active layer, and wherein the second optically active layer is provided in the form of a phase-shifting layer, namely a λ/2 layer for light from the first wavelength range, and is provided in the form of characters and/or patterns;

a security arrangement for security papers, valuable articles and the like, having said security element or said security element so manufacturable; and a separate display element that, in coaction with the security element or the security element so manufacturable, makes a color shift effect and/or a polarization effect and/or a brightness effect perceptible for the viewer; or a valuable article, such as a branded article, value document or the like, having said security element or the security element so manufacturable;

characterized; in that the security element, the security element so manufacturable, the security arrangement, or the valuable article is checked whether a predefined color shift effect is present and/or whether a predefined polarization effect and/or a predefined brightness effect is present, and the authenticity of the checked element is assessed on the basis of the check result.

* * * * *